Patented July 28, 1936

2,049,216

UNITED STATES PATENT OFFICE 2,049,216

COMPOUNDS SUITABLE FOR DYEING AND PRINTING

Eugene A. Markush, Jersey City, Mark S. Mayzner, Asbury Park, and Julius Miller, Newark, N. J., assignors to Pharma Chemical Corporation, New York, N. Y., a corporation of New York No Drawing. Application March 1, 1935, Serial No. 8,844

15 Claims. (Cl. 8—6)

Our invention relates to coloring matters, or dyes, and refers particularly to compounds of this general classification adaptable for coloring or dyeing cellulosic fibers.

We have found that valuable compounds suitable for the coloring, or dyeing of cellulosic fibers can be produced by combining a coupling component such as the arylides of beta-hydroxy-naphthoic acid with a diazotized amine having the general formula:

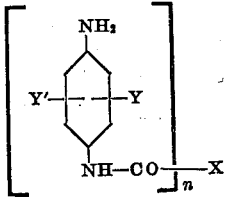

in which Y and Y' are the same or different alkyl or alkoxy groups and X represents an aliphatic residue of not less than four carbon and not more than six carbon acid and "$n$" is 1 when this aliphatic group is the residue of a monobasic acid and "$n$" is 2 when the aliphatic group is the residue of a dibasic acid.

The compounds of our invention may be produced in substance or upon the cellulosic fiber.

In producing the compounds of our invention in substance, the diazotized compound is combined with the coupling component; while in producing them upon the fiber, the fiber may be first treated, or impregnated, with the coupling component and the diazotized compound applied thereto, or the fiber treated, or impregnated, with the coupling component may be converted into our new compound by the application of a stabilized compound of the diazotized product and then subjected to an acid treatment, or the stabilized compound of the diazotized product may be mixed with the coupling component and this mixture applied to the fiber and developed thereon by an acid treatment.

We give the following as an example of the production of a compound of our invention by applying a stabilized compound of the diazotized product and a coupling component.

Example 1.

A mixture of 10 parts 2.5-diethoxy-4-butyryl-amino-diazo-imino-benzol-1-proline and 6.9 parts beta-hydroxy-naphthoic-acid-ortho-toluidide is pasted up with 500 parts of water and 18 parts of sodium hydrate 30° Bé. The mixture is thoroughly stirred and heated to 40° C., until a clear solution results. Acetic or formic acid is added slowly until the solution shows excess of acid and the heating continued. A dark blue precipitate separates out. The temperature is maintained at 80°–90° C. until no further dye is formed. The dye is filtered, washed thoroughly, and dried. The bright blue pigment obtained has excellent properties. Its formula is probably:

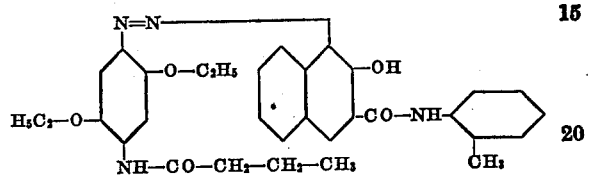

We give the following as an example of the production of a compound of our invention in substance employing a diazotized compound and a coupling component.

Example 2

One mol. of the sodium salt of beta-hydroxy-naphthoic-acid-ortho-toluidide are dissolved in about 800 parts of water and mixed with an excess of a sodium acetate solution. Into the solution thus prepared is run a diazo compound produced in the known manner from 1 mol. of 2.5-diethoxy-4-butyryl-amino-1-amino-benzol. Coupling takes place and the dyestuff filtered and dried.

Example 3

10 parts of 2:5 diethoxy-4-butyryl-amino-diazoimino-benzol-1-proline are intimately mixed with 6.9 parts beta-hydroxy-naphthoic acid ortho-toluidide and stirred with 100 parts of water to a thin paste.

To this is now added 18 parts sodium hydrate solution 30° Bé., and 25 parts "cellosolve". The mixture is heated gently until a clear solution results (about 50° C.) and then thickened with 300 parts of starch-tragacanth paste. The paste is printed on the fiber in the well-known manner. After drying, either on the can or in warm air, it is developed in a live steam ager with acetic acid for three to five minutes or by immersing in a hot bath containing salt and acetic or formic acid, until maximum intensity is reached. The developed material is then soaped hot, rinsed well, and dried. A beautiful brilliant blue is obtained.

We give the following as an example of the production of one of our compounds by the padding method.

Example 4

The material is padded with 100 parts beta-hydroxy-naphthoic-acid-ortho-toluidide in the usual manner.

The diazonium is prepared by pasting 35 parts 2.5 diethoxy-4-butyryl-amino-aniline-hydrochloride in 200 parts of water and 30 parts of hydrochloric acid 20 Bé. Cool to 5° C. by means of ice and add slowly a solution of 7 parts sodium nitrite dissolved in 35 cc. of water. The mineral acid of the greenish yellow diazonium solution, when finished, is eliminated by the addition of sodium acetate. If the padded material is cloth, the diazonium may be printed on by thickening with starch tragacanth. Padded cloth or hank may be developed in the usual immersion method. After printing or immersing with the diazonium the cloth is aged, soaped, rinsed, and dried.

We give the following as an example of padding with stabilized diazoniums and naphthoic acid arylamides:

Example 5

The padding method can also be used by applying stabilized diazoniums: The material is padded with 100 parts beta-hydroxy-naphthoic acid-ortho-toluidide in the usual manner.

The diazonium is prepared in the known manner from 35 parts of 2.5-diethoxy-4-butyryl-amino-diazoimino-benzol-1-proline. The solution is neutralized with sodium acetate. The diazonium may be printed on by thickening with starch tragacanth. After printing the cloth is dried, developed in a live steam ager with acetic acid or immersed in a solution containing acetic acid or formic acid, then soaped, rinsed, and dried.

We give the following as further examples of the production of compounds of our invention.

Example 6

10 parts of the diazo-imino compound obtained by condensing in alkaline solution the diazonium of 2:5-dimethoxy-4-butyryl-amino-aniline of the formula

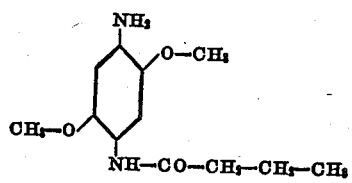

with hydroxy-proline, subsequently salted, filtered, and dried, are mixed with 8 parts beta-hydroxy-naphthoic acid-anilide. The mixture, if treated, printed, and developed as previously described, yields a bright reddish blue of excellent properties.

This mixture may be used also to obtain the dye in substance when the solution is treated with acetic or formic acid as previously described. The pigment is a brilliant reddish-blue powder with excellent properties. Its probable formula is:

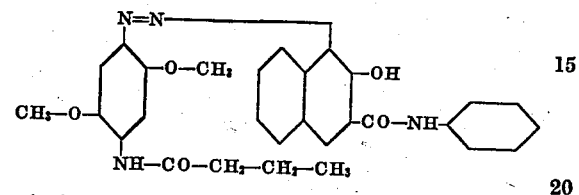

As in Example 1, the dye may also be prepared by combining the diazonium solution with the coupling component or on the goods by the diazonium and the padded material in the manner previously mentioned.

Example 7

A mixture of 10 parts 2.5 dimethoxy-4-valeryl-amino-diazo-amino-benzol-piperidine-carboxylic acid and 6.9 parts beta-hydroxy-naphthoic acid-chlor-anilide is pasted up with 500 parts of water and 18 parts of sodium hydrate 80° Bé. The mixture is thoroughly stirred and heated to 40° C., until a clear solution results. Acetic or formic acid is added slowly until the solution shows excess of acid and the heating continued. A blue precipitate separates out. The temperature is maintained at 80°–90° C., until no further dye is formed. The dye is filtered, washed thoroughly, and dried. The bright blue pigment obtained has excellent properties. Its formula is probably:

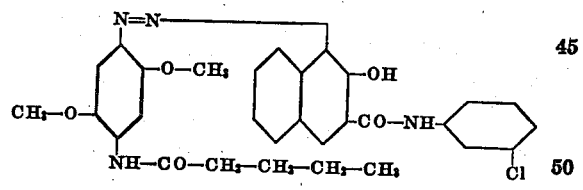

Example 8

Blue dye is obtained by using as above a mixture of 10 parts 2-ethoxy-5-methoxy-4-isobutyryl-amino-1-diazo-benzol-dicarboxy-pyrolidine and 7 parts beta-hydroxy-naphthoic acid-ortho-toluidide. The probable formula is:

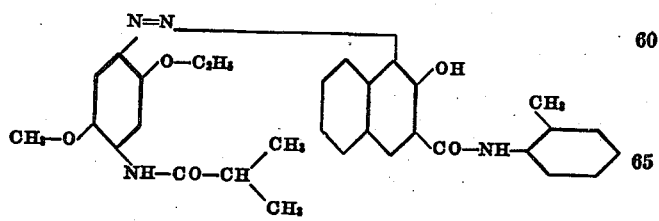

Example 9

Clear shade is obtained by applying a mixture of 10 parts 2-ethoxy-5-methyl-4-[methyl-ethyl-acetyl-1-amino]-1-diazo-benzol-proline and 7 parts beta-hydroxy-naphthoic acid orthotoluidide. The probable formula of the dye is:

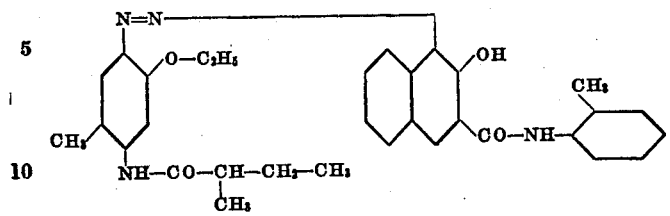

Example 10

A water insoluble azo dye which comprises coupling 2.3 hydroxy-naphthoic acid-xylidide with the diazo compound of 2.5-methyl-4-[capyryl-amino]-1-amino-benzol. The formula of the dye is:

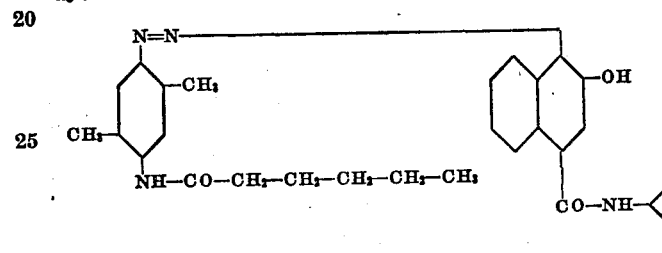

Example 11

A water insoluble azo dye which comprises coupling 2.3-hydroxy-naphthoic acid-toluidide with butylene - dicarboxyl - di-(4-amino-2.5-ethoxy-1-amino benzol), also called adipyl-bis (4-amino-2.5-ethoxy-1-amino-benzol). The general formula of the dye is:

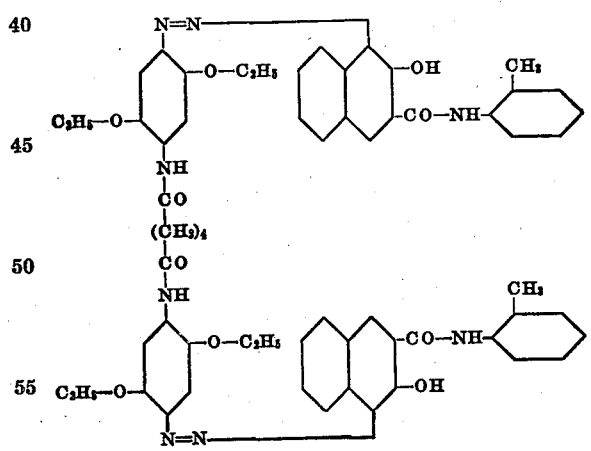

The following arylamides of 2.3 hydroxy-1-naphthoic acid may also be used as coupling components:
2'3' hydroxy-naphthoic acid-o-anisidide
2'3' hydroxy-naphthoic acid-2-naphthylamide
2'3' hydroxy-naphthoic acid-3-nitroanilide
2'3' hydroxy-naphthoic acid-4-chlor-2-toluidide By "stabilizers", we mean those compounds which combine with diazotized compounds having a stabilizing effect thereon and which can be split off by acid treatment.

The stabilizers are not limited to those cited in the examples, and stabilized diazoniums of the following nature may also be used:

2.5-diethoxy-4-butyryl - amino - diazo - imino - benzol-dicarboxyl piperidine 2.5 - dimethoxy-4-capyryl - amino-1-diazo-imino-benzol-methyl-amino-acetic acid
2.5-dimethoxy-4-isobutyryl - amino - 1 - diazo-imino-benzol-4-sulfo-2-amino-benzoic acid We do not limit ourselves to the particular compounds, times, temperatures, quantities, or steps of procedure mentioned and described as these are given simply for the purpose of clearly explaining our invention.

What we claim is:
1. The process of producing water-insoluble colored compounds which comprises combining an arylide of beta-hydroxy-naphthoic acid with a diazotized amine the amine having the general formula

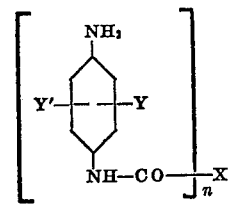

in which Y and Y' are the same or different alkyl or alkoxy groups and X represents an aliphatic residue of not less than a four carbon acid and not more than a six carbon acid and $n$ is 1 when this aliphatic group is the residue of a monobasic acid and $n$ is 2 when the aliphatic group is the residue of a dibasic acid.

2. The process of producing water-insoluble colored compounds which comprises combining an arylide of beta-hydroxy-naphthoic acid with diazotized 2:5 diethoxy-4-butyryl-amino-aniline the dye having the formula

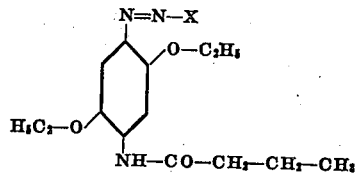

in which X is an arylide of beta-hydroxy-naphthoic acid.

3. The process of producing water-insoluble colored compounds which comprises combining beta - hydroxy - naphthoic - acid - 3 - chloranilide with diazotized 2:5 diethoxy-4-butyrylamino-aniline the dye having the formula

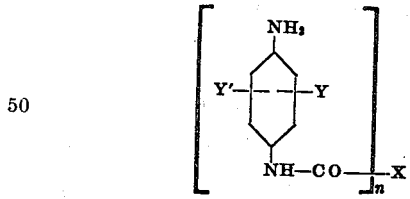

4. Water-insoluble colored compounds producible by combining an arylide of beta-hydroxy-naphthoic acid with a diazotized amine the amine having the general formula

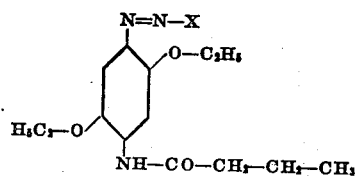

in which Y and Y' are the same or different alkyl or alkoxy groups and X represents an aliphatic residue of not less than a four carbon acid and not more than a six carbon acid and $n$ is 1 when this aliphatic group is the residue of a monobasic acid and $n$ is 2 when the aliphatic group is the residue of a dibasic acid.

5. Water-insoluble colored compounds producible by combining an arylide of beta-hydroxy-naphthoic-acid with diazotized 2:5 diethoxy-4-butyryl-amino-aniline and having the formula

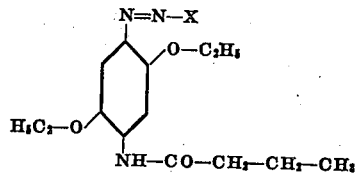

in which X is an arylide of beta-hydroxy-naphthoic acid.

6. The water-insoluble colored compound producible by combining beta-hydroxy-naphthoic-acid chlor-anilide with diazotized 2:5 diethoxy-4-butyryl-amino-aniline and having the formula

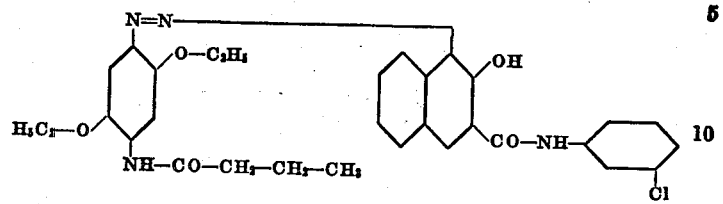

7. The process of producing water-insoluble colored compounds which comprises mixing an arylide of beta-hydroxy-naphthoic acid with a stabilized diazotized amine having the general formula

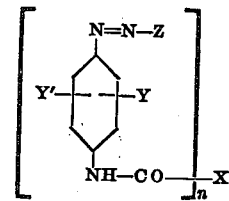

in which Y and Y' are the same or different alkyl or alkoxy groups and X represents an aliphatic residue of not less than a four carbon acid and not more than a six carbon acid and $n$ is 1 when this aliphatic group is the residue of a monobasic acid and $n$ is 2 when the aliphatic group is the residue of a dibasic acid and Z is the residue of a stabilizing compound which will be split off by treatment with acid and subjecting the mixture to acid treatment.

8. The process of producing water-insoluble colored compounds which comprises mixing an arylide of beta-hydroxy-naphthoic acid with stabilized diazotized 2:5 diethoxy-4-butyryl-amino-aniline, said stabilizer being capable of being split off by treatment with acid and subjecting the mixture to acid treatment.

9. The process of producing water-insoluble colored compounds which comprises mixing beta-hydroxy-naphthoic-acid-chlor-anilide with stabilized diazotized 2:5 diethoxy-4-butyryl-aminoaniline, said stabilizer being capable of being split off by treatment with acid and subjecting the mixture to acid treatment.

10. The process of producing water-insoluble colored compounds which comprises mixing an arylide of beta-hydroxy-naphthoic acid with a stabilized diazotized amine having the general formula

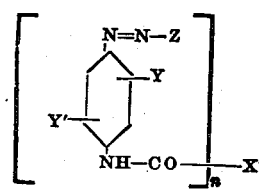

in which Y and Y' are the same or different alkyl or alkoxy groups and X represents an aliphatic residue of not less than a four carbon acid and not more than a six carbon acid and $n$ is 1 when this aliphatic group is the residue of a monobasic acid and $n$ is 2 when the aliphatic group is the residue of a dibasic acid and Z is the residue of a stabilizing compound which will be split off by treatment with acid of the group consisting of proline and piperidine compounds and subjecting the mixture to acid treatment.

11. The process of producing water-insoluble colored compounds which comprises mixing an arylide of beta-hydroxy-naphthoic acid with a stabilized diazotized 2:5 diethoxy-4-butyryl-amino-aniline, said stabilizer being a member of the group consisting of proline and piperidine compounds, and subjecting the mixture to acid treatment.

12. The process of producing water-insoluble colored compounds which comprises mixing beta-hydroxy-naphthoic-acid-chlor-anilide with stabilized diazotized 2:5 diethoxy-4-butyryl-amino-aniline, said stabilizer being a member of the group consisting of proline and piperidine compounds, and subjecting the mixture to acid treatment.

13. Cellulosic fibers imprinted with the water-insoluble colored compounds of claim 1.

14. Cellulosic fibers imprinted with the water-insoluble colored compounds of claim 2.

15. Cellulosic fibers imprinted with the water-insoluble colored compounds of claim 3.

EUGENE A. MARKUSH.
MARK S. MAYZNER.
JULIUS MILLER.